(12) United States Patent
Kelly (10) Patent No.: US 11,591,086 B2
(45) Date of Patent: Feb. 28, 2023

(54) HYBRID MULTI-ROTOR UNMANNED AERIAL VEHICLE WITH ADJUSTABLE WINGS

(71) Applicant: AV8OR IP LIMITED, Doncaster (GB)

(72) Inventor: Graham Lee Kelly, Swinton (GB)

( * ) Notice: Subject to any disclaimer, the term of this patent is extended or adjusted under 35 U.S.C. 154(b) by 516 days.

(21) Appl. No.: 16/632,129

(22) PCT Filed: Jul. 10, 2018

(86) PCT No.: PCT/GB2018/051946
§ 371 (c)(1),
(2) Date: Jan. 17, 2020

(87) PCT Pub. No.: WO2019/016513
PCT Pub. Date: Jan. 24, 2019

(65) Prior Publication Data
US 2020/0223544 A1 Jul. 16, 2020

(30) Foreign Application Priority Data
Jul. 21, 2017 (GB) ........................................ 1711759

(51) Int. Cl.
*B64C 39/02* (2006.01)
(52) U.S. Cl.
CPC ...... *B64C 39/024* (2013.01); *B64C 2201/021* (2013.01); *B64C 2201/024* (2013.01);
(Continued)
(58) Field of Classification Search
CPC ............ B64C 39/024; B64C 2201/021; B64C 2201/024; B64C 2201/027;
(Continued)

(56) References Cited

U.S. PATENT DOCUMENTS

| 6,318,677 B1 * | 11/2001 | Dixon | ..................... B64C 23/06 244/214 |
| 8,602,348 B2 * | 12/2013 | Bryant | ..................... B64C 39/10 244/23 B |

(Continued)

FOREIGN PATENT DOCUMENTS

| CN | 104608924 A | 5/2015 |
| CN | 105314105 A | 2/2016 |

(Continued)

*Primary Examiner* — Medhat Badawi
(74) *Attorney, Agent, or Firm* — Williams Intellectual Property (57) ABSTRACT

A hybrid unmanned aerial vehicle (10) is provided which comprises a multicopter frame (14) having a plurality of operable multicopter propulsion units (22) thereon, and an airframe body (16) which is connected to the multicopter frame (14). There is also a pair of wings (34) positioned on opposite sides of the airframe body (16) and a wing control means for manipulating the pair of wings (34) with respect to the airframe body (16) to alter an angle-of-attack of the pair of wings (34). In a first wing condition, the angle-of-attack of the pair of wings (34) is alterable with respect to a relative airflow so as to produce zero lift, and, in a second wing condition, the angle-of-attack of the pair of wings (34) is alterable with respect to the relative airflow so as to produce an optimum or near optimum lift. A method of improving the manoeuvrability of the hybrid unmanned aerial vehicle (10) is also provided, as is a method of improving the operational range of unmanned aerial vehicles.

19 Claims, 4 Drawing Sheets

(52) U.S. Cl.
CPC .. *B64C 2201/027* (2013.01); *B64C 2201/104* (2013.01); *B64C 2201/108* (2013.01)

(58) Field of Classification Search
CPC ........ B64C 2201/104; B64C 2201/088; B64C 2201/108; B64C 3/385; B64C 2201/165; Y02T 50/10
See application file for complete search history.

(56) References Cited

U.S. PATENT DOCUMENTS

| | | | |
|---|---|---|---|
| 8,821,128 B2* | 9/2014 | Bianchi | F03D 1/0675 |
| | | | 416/241 A |
| 10,717,522 B2* | 7/2020 | Taylor | B64C 11/32 |
| 10,994,851 B2* | 5/2021 | Bevirt | B64D 27/24 |
| 11,372,427 B2* | 6/2022 | Kawiecki | G05D 1/042 |
| 2011/0001020 A1* | 1/2011 | Forgac | B64C 29/0033 |
| | | | 244/7 A |
| 2011/0042508 A1* | 2/2011 | Bevirt | B64C 15/00 |
| | | | 244/75.1 |
| 2013/0062457 A1* | 3/2013 | Deakin | H01Q 9/27 |
| | | | 343/706 |
| 2017/0327218 A1* | 11/2017 | Morin | B64C 39/024 |
| 2020/0023960 A1* | 1/2020 | Taylor | B64C 27/605 |
| 2020/0223544 A1* | 7/2020 | Kelly | B64C 39/024 |
| 2020/0369384 A1* | 11/2020 | Kelly | G08G 5/006 |
| 2020/0387170 A1* | 12/2020 | Kawiecki | B64C 29/0033 |
| 2021/0107637 A1* | 4/2021 | Bachmann | B64C 27/22 |

FOREIGN PATENT DOCUMENTS

| | | |
|---|---|---|
| KR | 101796477 B1 | 11/2017 |
| WO | 2016035068 A2 | 3/2016 |
| WO | 2016092102 A1 | 6/2016 |

\* cited by examiner

HYBRID MULTI-ROTOR UNMANNED AERIAL VEHICLE WITH ADJUSTABLE WINGS

The present invention relates to an unmanned aerial vehicle having both multicopter and fixed-wing flight capability. The invention further relates to a method of improving the manoeuvrability of such an unmanned aerial vehicle, and to a method of improving an operational range of an unmanned aerial vehicle.

There are two main types of unmanned aerial vehicles which are used in current operations: multicopters, which have a plurality of multicopter propulsion units having rotors which achieve lift in a manner similar to helicopter blades; and fixed wing vehicles, which use fixed wings to achieve lift, similar to aeroplanes.

The advantages of a multicopter over the use of a fixed wing vehicle is that a multicopter is capable of vertical take-off and landing, and therefore does not require an elongate airstrip in order to take off and land. Multicopters are also capable of hovering, and are far more manoeuvrable in three dimensions; they are rapidly able to change direction in-flight, rather than following a largely linear trajectory.

Conversely, whilst a fixed-wing craft is considerably less agile than a multicopter, it is able carry a far greater payload and has a dramatically increased operational endurance; multicopter capability is primarily determined by its operational battery life, and the motors which power the multicopter propulsion units can quite quickly drain the onboard batteries.

The present invention seeks to provide a hybrid unmanned aerial vehicle which is able to combine the desirable characteristics of the fixed-wing craft with manoeuvrability of a multicopter.

According to a first aspect of the invention, there is provided a hybrid unmanned aerial vehicle comprising: a multicopter frame having a plurality of multicopter propulsion units thereon; an airframe body which is connected to the multicopter frame; a pair of wings positioned on opposite sides of the airframe body; and a wing control means for manipulating the pair of wings with respect to the airframe body to alter an angle-of-attack of the pair of wings; wherein, in a first wing condition, the angle-of-attack of the pair of wings is alterable with respect to a relative airflow so as to produce zero lift, and, in a second wing condition, the angle-of-attack of the pair of wings is alterable with respect to the relative airflow so as to produce an optimum or near optimum lift. Preferably, in the first wing condition, the angle-of-attack may be or may substantially be vertical with respect to the relative airflow, and in the second wing condition, the angle-of-attack may be or may substantially be horizontal with respect to the relative airflow.

The provision of a hybrid unmanned aerial vehicle which has both multicopter and fixed-wing functionality can achieve the vertical take-off and landing capabilities of a multicopter, as well as improved aerial agility, whilst being able to improve the operational range of the vehicle by using fixed-wing flight during controlled horizontal flight, in which lift is exclusively or almost exclusively achieved via the pair of wings in the second condition. In multicopter mode, the wing angle can be optimised to minimise drag.

Preferably, the pair of wings may be interconnected by a wing axle which is coupled to the airframe body, the wing axle being controllable by the wing control means. Such a wing control means may preferably comprise a motor having a geared output, the wing axle including a complementary gear thereon which is drivable by the geared output of the motor. The geared output optionally includes a worm gear, and the motor is preferably a stepper motor.

A mechanically simple method of providing in-flight adjustment to the angle-of-attack of the wings is by the use of a drivable axle, with a calibrated stepper motor which is able to accurately rotate the axle. This beneficially keeps the weight of the wing control means to a minimum, since a large number of complex parts are not necessary, which in turn, improves the operational range of the hybrid unmanned aerial vehicle.

In a preferred embodiment, the wing axle may be coincident with a vertical plane through the multicopter frame containing the centre-of-gravity of the hybrid unmanned aerial vehicle.

If the wing axle is centrally located, the angle-of-attack can be tilted in either direction, permitting controlled flight in either a forwards or backwards direction. The provision of the multicopter functionality permits this approach, since standard fixed-wing unmanned aerial vehicles can only follow a trajectory in a forwards-direction due to the asymmetric front-rear construction which is required in order to obtain the necessary lift for flight.

In an alternative embodiment, an angle-of-attack of each wing of the pair of wings may be independently alterable by the wing control means, in which case, the wing control means may comprise a pair of motors each having a geared output, each wing of the pair of wings having a complementary gear associated therewith which is drivable by a respective motor of the pair of motors.

Whilst the mechanically simple approach detailed previously may result in a greater operational range of the hybrid unmanned aerial vehicle, independently controllable wings may achieve greater aerial agility of the vehicle, which may be more useful in certain operational settings.

Preferably, each wing of the pair of wings may be symmetric in at least one plane.

The symmetry of the wings enables agile movement of the hybrid unmanned aerial vehicle in three-dimensions; an asymmetric wing configuration would result in uneven drag on the wings in certain configurations, which could destabilise the flight of the hybrid unmanned aerial vehicle.

In one optional embodiment, the hybrid unmanned aerial vehicle may further comprise an airframe referencing means for determining a displacement of the airframe body with respect to a horizontal plane. Preferably, the airframe referencing means may comprise an inertial measurement unit. Said airframe referencing means may comprise a plurality of accelerometers and/or gyroscopes positioned on the airframe body or multicopter frame.

The referencing of the airframe body enables accurate control of the flight path of the hybrid unmanned aerial vehicle, since tilt relative to the horizontal may achieve directional thrust of the hybrid unmanned aerial vehicle. The referencing also advantageously allows the hybrid unmanned aerial vehicle to adapt to the environmental conditions, and adjust the angle-of-attack of the wings for optimum flight.

Preferably, the wing control means comprises a controller which is in communication with the airframe referencing means, the controller receiving an airframe orientation from the airframe referencing means, and the controller determining an actuation required by the wing control means to alter the current angle-of-attack of the pair of wings to a desired angle-of-attack based on the airframe orientation.

Feedback control of the angle-of-attack beneficially allows for the hybrid unmanned aerial vehicle to adapt to relative airflow, as well as modify its flight path according to its mission parameters, or indeed, any other constraints which might be imposed, such as those by aviation authorities.

The hybrid unmanned aerial vehicle may further comprise a wing referencing means for determining a displacement of the pair of wings with respect to the airframe body and/or the relative airflow and/or a horizontal plane, the controller being in communication with the wing referencing means to receive a wing orientation therefrom. The wing referencing means may comprise an inertial measurement unit. Preferably, the wing referencing means may comprise a plurality of accelerometers and/or gyroscopes positioned on the pair of wings.

The referencing of the wings can further improve the accuracy of the feedback control of the angle-of-attack, ensuring that unintentional deflection of the wings in-flight can be accounted for.

Optionally, the controller may include a memory storage element having wing parameter data stored thereon, the controller being configured to use the wing parameter data to determine the said actuation.

Wing parameter data, for example, referenced positional, weight or volumetric data relating to the wings, may be important for the calculation of the optimal angle-of-attack, and therefore it may be beneficial for the controller to have access to such data in-flight.

Preferably, the pair of wings may be removably engagable with the airframe body, the wing parameter data comprising data indicative of wing characteristics of a plurality of different pairs of wings.

The provision of different wing types which are engagable with the hybrid unmanned aerial vehicle allows for different mission types to be undertaken by a single vehicle, greatly improving the operational capabilities thereof.

Preferably, the controller may include an airflow calculation circuit for determining airflow information data across the hybrid unmanned aerial vehicle, the controller being configured to use the airflow information data to determine the said actuation.

Airflow information data can be important, since changing relative airflow with respect to the airframe can rapidly alter what might be considered to be the optimum angle-of-attack for the hybrid unmanned aerial vehicle. As such, manipulation of the wings based on such data may beneficially improve flight performance.

It is preferred that the wing control means is operable independently of the plurality of operable multicopter propulsion units.

Since there may well be multiple operational modes for the hybrid unmanned aerial vehicle, in particular during ascent and descent, it is preferred that operation of the respective control electronics is compartmentalised, such that the wings can be operated independently or pseudo-independently of the multicopter functionality.

In an alternative arrangement, the wing control means may be adapted to alter a shape of the pair of wings so as to alter the angle-of-attack. The pair of wings may include flaps, ailerons or flaperons to alter the shape thereof in-flight, may be adaptable via wing-warping, and/or may be formed from meta-materials to allow the shape thereof to be altered in-flight.

Whilst angular re-positioning of the wings may be the simplest mechanism by which the angle-of-attack can be adjusted, it will be appreciated that other mechanisms are available, for example, in adjustment of the shape of the wing during flight using flaps, ailerons or flaperons, or even by forming the wings out of meta-materials.

According to a second aspect of the invention, there is provided a method of improving the manoeuvrability of unmanned aerial vehicles, the method comprising the steps of: a] providing a hybrid unmanned aerial vehicle in accordance with the first aspect of the invention; b] altering the angle-of-attack of the pair of wings into the first wing condition to perform a first aerial manoeuvre; and c] altering the angle-of-attack of the pair of wings into the second wing condition to perform a second aerial manoeuvre.

There are two main conditions for the hybrid unmanned aerial vehicle: firstly, a mainly multicopter-style flight condition, in which the pair of wings is aligned so as to minimise drag during any manoeuvre; and a fixed-wing flight condition, in which lift is provided primarily be the pair of wings, with the multicopter propulsion units being used to provide directional thrust. In the first condition, the agility of the hybrid unmanned aerial vehicle is improved, whereas the power-consumption efficiency of controlled flight in the second condition is much improved. Switching between the two conditions therefore allows the hybrid unmanned aerial vehicle to optimise flight characteristics according to its situation, preferably automatically so.

Preferably, the first aerial manoeuvre may be a vertical or substantially vertical ascent or descent of the hybrid unmanned aerial vehicle. Furthermore, the second aerial manoeuvre may be a controlled horizontal or substantially horizontal flight, a stationary hover, or a controlled vertical or substantially vertical ascent or descent of the unmanned aerial vehicle.

According to a third aspect of the invention there is provided a method of improving an operational range of an unmanned aerial vehicle, the method comprising the steps of: a] utilising a plurality of operable multicopter propulsion units of the unmanned aerial vehicle to generate vertical lift during an ascent or descent; b] utilising a pair of wings of the unmanned aerial vehicle to generate additional lift during a period of horizontal flight, the plurality of operable multicopter propulsion units providing directional thrust; and c] altering the angle-of-attack of the pair of wings to change the lift on the unmanned aerial vehicle during flight.

The invention will now be more particularly described, by way of example only, with reference to the accompanying drawings, in which.

Figure 1:
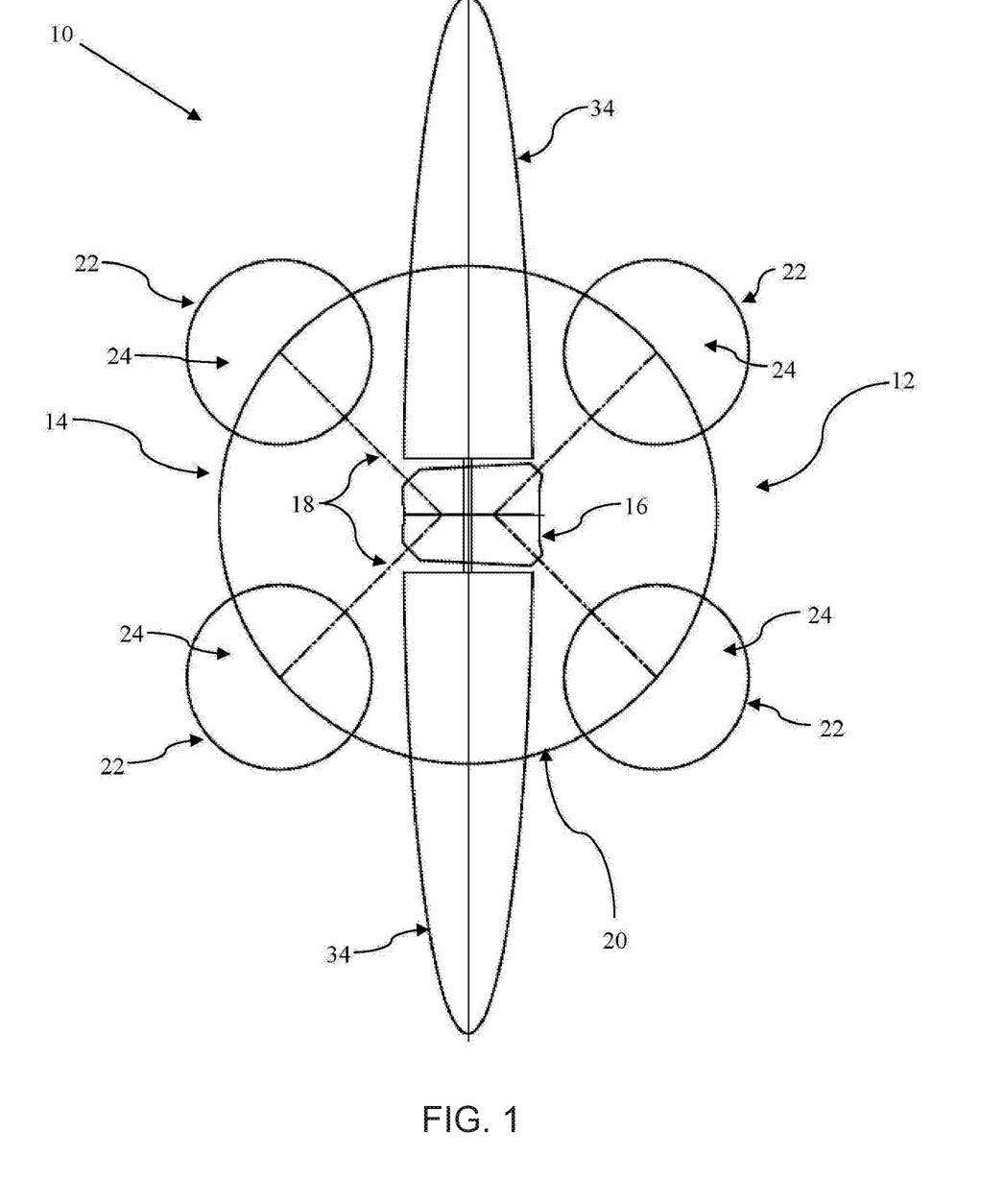
FIG. 1 shows a plan schematic view of one embodiment of a hybrid unmanned aerial vehicle in accordance with the first aspect of the invention.

Referring to FIG. 1, there is illustrated a hybrid unmanned aerial vehicle, indicated globally at 10. The term hybrid here refers to the use of both multicopter and fixed-wing aspects within the unmanned aerial vehicle 10, and in particular where the airframe is itself a hybrid multicopter/fixed-wing airframe.

The hybrid unmanned aerial vehicle 10 comprises a vehicle body 12 having a multicopter frame 14 which is connected to an airframe body 16. The multicopter frame 14 and airframe body 16 may be releasably connectable, or may be integrally formed with one another.

The multicopter frame 14 is preferably formed as having a plurality of frame arms 18 which extend from a centre of the hybrid unmanned aerial vehicle 10 to radial points of an outer frame member 20 of the multicopter frame 14. The outer frame member 20 is here provided as a circular frame member which provides rigid interconnection between rotor mounting points of the multicopter frame, at each of which is provided a multicopter propulsion unit 22. It is noted that the frame arms 18 of the present hybrid unmanned aerial vehicle 10 do not exactly follow the radii of the outer frame member 20, but there is no reason why they could not do so.

A plurality of operable rotor blades 24 are provided attached to the multicopter frame 14, and these are able to provide multicopter functionality to the hybrid unmanned aerial vehicle 10; in particular, the multicopter propulsion units 22 provide lift during vertical manoeuvring of the hybrid unmanned aerial vehicle 10 and provide directional thrust during controlled horizontal flight. In the depicted embodiment, the hybrid unmanned aerial vehicle 10 is a four-armed multicopter having a pair of rotor blades 24 at the end of each frame arm 18. Each pair of rotor blades is provided as upper and lower rotor blades 24a, 24b for accurate thrust control. It will be apparent that any suitable multicopter arrangement, such as quadcopter, hexacopter or octocopter arrangements, for instance, may be utilised to provide the multicopter functionality of the hybrid unmanned aerial vehicle 10.

Each multicopter propulsion unit 22 therefore comprises the upper and lower rotor blades 24a, 24b, a motor, preferably a brushless motor, associated with each of the upper and lower rotor blades 24a, 24b, and an electronic speed controller. Such an arrangement provides an excellent thrust output, thereby achieving the maximum possible lift capability for the hybrid unmanned aerial vehicle 10. Other multicopter propulsion unit configurations could be considered, however. For instance, a centralised speed controller could be provided which is in communication with each motor, and this could be considered as a dedicated flight controller for the hybrid unmanned aerial vehicle 10. Of course, alternative multicopter propulsion units could be envisaged, for example, in the use of turboprop engines or adjustable jet engines.

Figure 2:
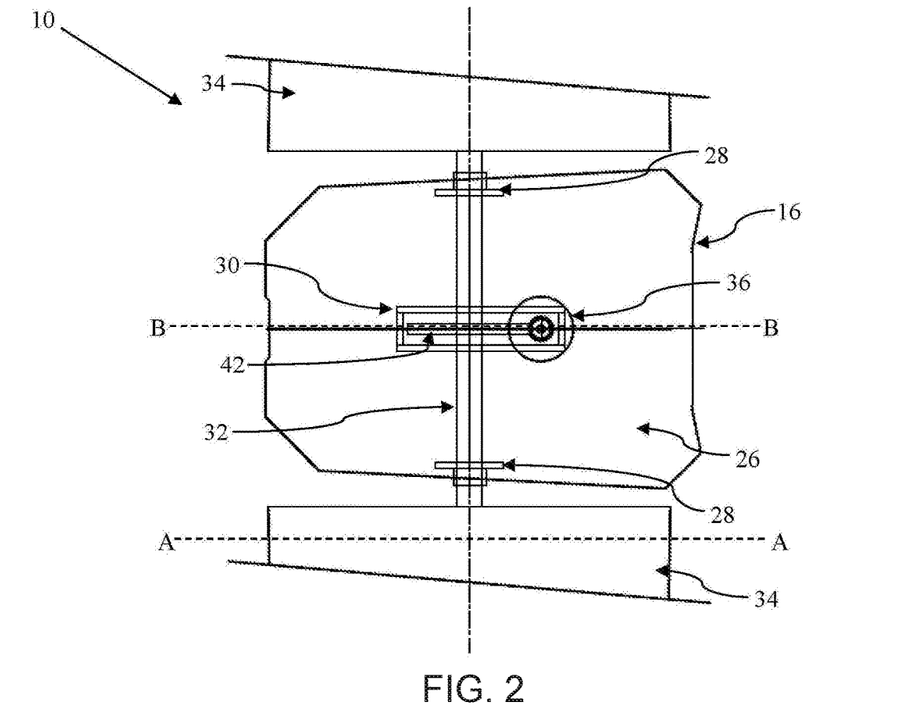
FIG. 2 shows a cross-sectional schematic view through a central horizontal plane of a central portion of the hybrid unmanned aerial vehicle shown in FIG. 1.

The airframe body 16 is here formed having a base element 26 to which is coupled a pair of axle bearings 28, and a central housing 30 within which the control equipment for the hybrid unmanned aerial vehicle 10 may be housed. The axle bearings 28 support a wing axle 32 which spans the base element 26 and to which is connected a pair of wings 34; one wing 34 positioned on each end of the wing axle 32. This arrangement can be readily seen in FIGS. 2 to 4 of the drawings. This is, however, merely an indicative embodiment of the airframe body 16, and may alternative airworthy forms may be considered.

Figure 3:
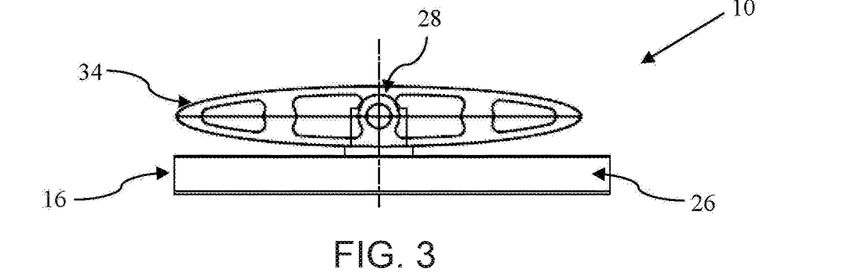
FIG. 3 shows a cross-sectional schematic view through the vertical plane through line A-A in FIG. 2.

The wings 34 are preferably formed so as aerofoils which are symmetric in a front-to-rear direction to enable controlled flight in both directions. Preferably, the wings 34 may also be symmetric in a top-to-bottom direction. As can be seen in FIG. 3, each wing 34 may be largely hollow, thereby keeping the weight of each wing 34 to a minimum, without compromising the structural integrity thereof.

The wings 34 may be provided so as to be removably engagable with the airframe body 16 and/or the wing axle or axles 32 to which they are mounted. This may allow the hybrid unmanned aerial vehicle 10 to be scaled according to its mission. One set of wings 34 may be suitable for heavy lifting purposes, whilst another may be suitable to high-agility flight profiles. Wings of different surface areas will be capable of generating a given amount of lift for different sizes of airframe body 16.

A wing control means is provided on or in the airframe body 16, and here, the wing control means comprises a motor 36, preferably a brushless motor, which has an output shaft 38 which can provide drive to the wing axle 32. There may also be provided a dedicated wing controller, which is preferably formed as a microprocessor in communication with the motor 36. In the present arrangement, the coupling between the motor 36 and the wing axle 32 is provided by a geared output 40, preferably a worm gear, on the output shaft 38, which couples to a complementary gear 42 engaged with the wing axle 42.

The wing axle 32 is preferably provided so as to be coincident with a vertical plane containing the centre-of-gravity of the hybrid unmanned aerial vehicle 10; unlike in manned aerial vehicles, the centre-of-gravity of unmanned aerial vehicles is generally aligned with the centre of the unmanned aerial vehicle. As such, there is not a requirement to offset the wing position with respect to a centre-point of the vehicle in order to achieve the necessary lift for flight. As such, the wing axle 32 may be positionable so as to achieve both forward and reverse flight.

Figure 4:
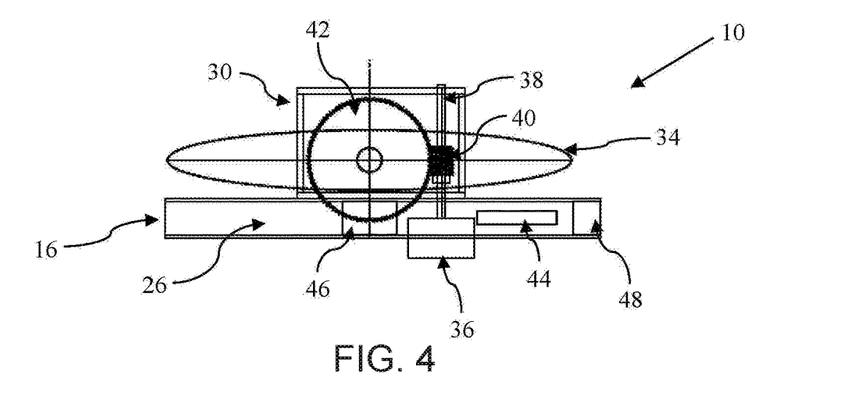
FIG. 4 shows a cross-sectional schematic view through the vertical plane through line B-B in FIG. 2.

There is provided, as can be best seen in FIG. 4, a controller 44 which is communicable with the motor 36 to alter the rotational position of the wing axle 32, and in turn, the angle-of-attack of the pair of wings 34. The angle-of-attack is here defined as the angle between a chord line of the wings 34 and the relative airflow.

Preferably, the controller 44 is formed as a proportional-integral-derivative (PID) controller, which continuously calculates an error value between a desired setpoint and a measured position of the wing axle 32 and/or pair of wings 34.

The controller 44 may be configured so as to calculate the optimum angle-of-attack for any given situation, in which case the controller 44 may include a memory storage element having wing parameter data stored thereon, with the controller 44 being configured to use the wing parameter data to determine a necessary actuation of the motor 36. Similarly, the controller 44 includes an airflow calculation circuit for determining airflow information data across the hybrid unmanned aerial vehicle 10. The controller 44 is then configured to use the airflow information data to determine a necessary actuation of the motor 36.

The airframe body 16 may further include an airframe referencing means, which is able to provide a measurement of displacement of the airframe body 16 with respect to a horizontal plane, in flight. Preferably, the airframe referencing means may comprise an inertial measurement unit, which here includes at least one accelerometer 46 and/or gyroscope 48 which is mounted to or positioned onboard the airframe body 16 or multicopter frame 14.

The airframe referencing means may be in communication with the controller 44 in order that the optimum angle-of-attack can be determined, and therefore that the position of the pair of wings 34 can be adjusted. The angle-of-attack could feasibly be determined with reference to the airframe referencing means and a motor 36 position, for instance; however, such a determination may not be sufficiently accurate for flight.

It may therefore also be useful to provide a dedicated wing referencing means, again, preferably formed as an inertial measurement unit, and more preferably including one or more accelerometers and/or gyroscopes which can feed a wing position back to the controller 44 with respect to either the horizontal plane or the referenced airframe body 16 position. The wing referencing means is preferably attached directly to the or each of the pair of wings 34.

Figure 5:
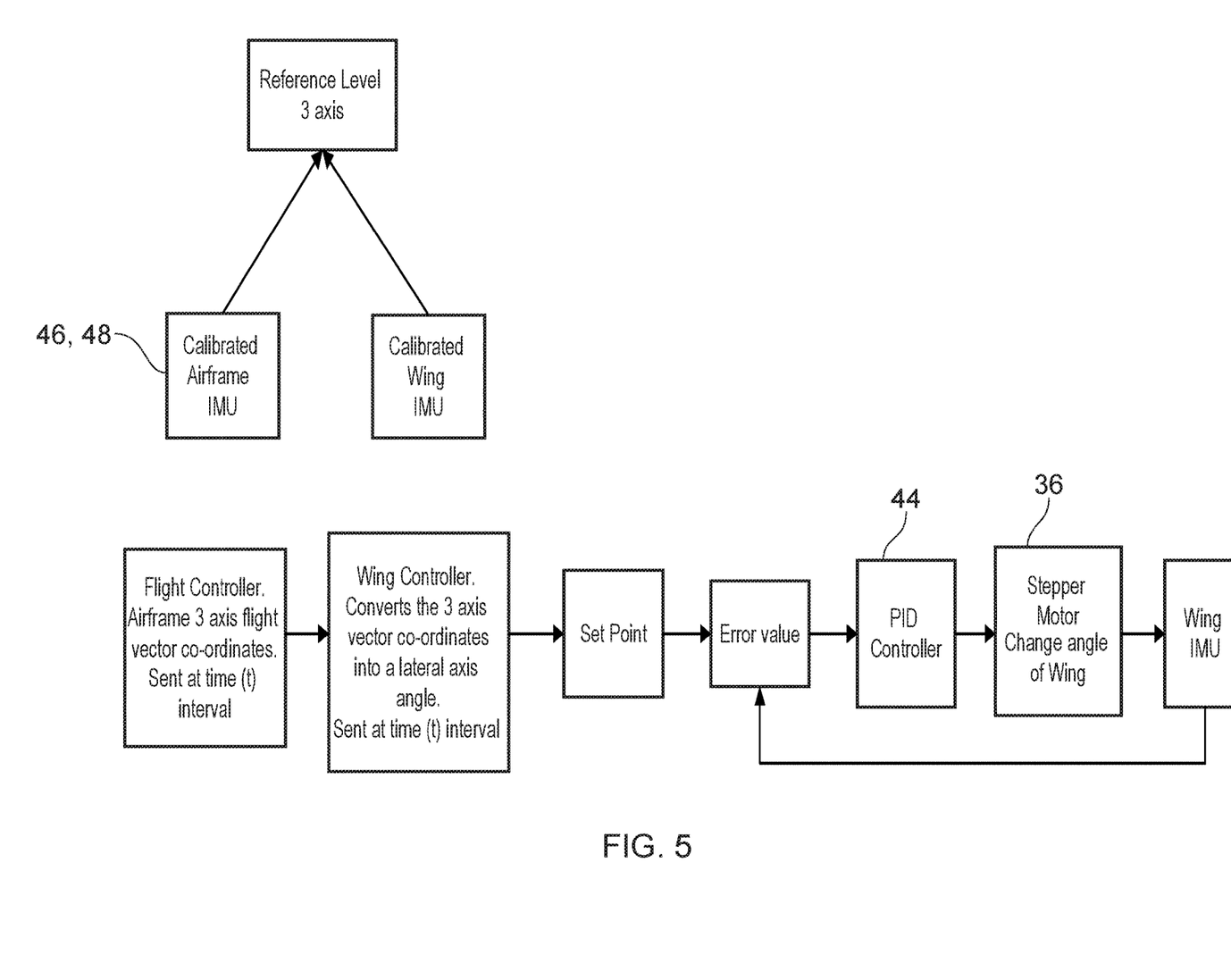
FIG. 5 shows an information flow diagram of one method of controlling the wings of the hybrid unmanned aerial vehicle of FIG. 1.

An indicative control logic for the wing control can be seen in FIG. 5. The airframe referencing means and/or wing referencing means can be used to produce a three-dimensional reference frame of the hybrid unmanned aerial vehicle 10 with respect to a horizontal plane.

The flight controller can be used to determine flight vector co-ordinates for the hybrid unmanned aerial vehicle 10 within the three-dimensional reference frame, and the wing controller can be used to convert the vector co-ordinates into a lateral angle for defining the angle-of-attack of the pair of wings 34. This determination in turn provides a target or set point for the motor 36 of the wing control means to aim towards.

The current position of the pair of wings 34 allows for determination of an error value or deviation from the target position. The controller 44 can activate the motor 36 to provide an actuation to the wing axle 32, in turn moving the pair of wings 34 into position. If the stepper motor 36 is accurately referenced, then the controller 44 will have the necessary information to determine the position of the wings 34 at any given time.

However, it is preferred that the wing inertial measurement sensor is provided in order for the position of the pair of wings 34 to be more accurately determined. In this case, the wing inertial measurement sensor can be configured to provide feedback to the controller 44 such that the correct angle-of-attack for any given flight-plan can be maintained.

Figure 6:
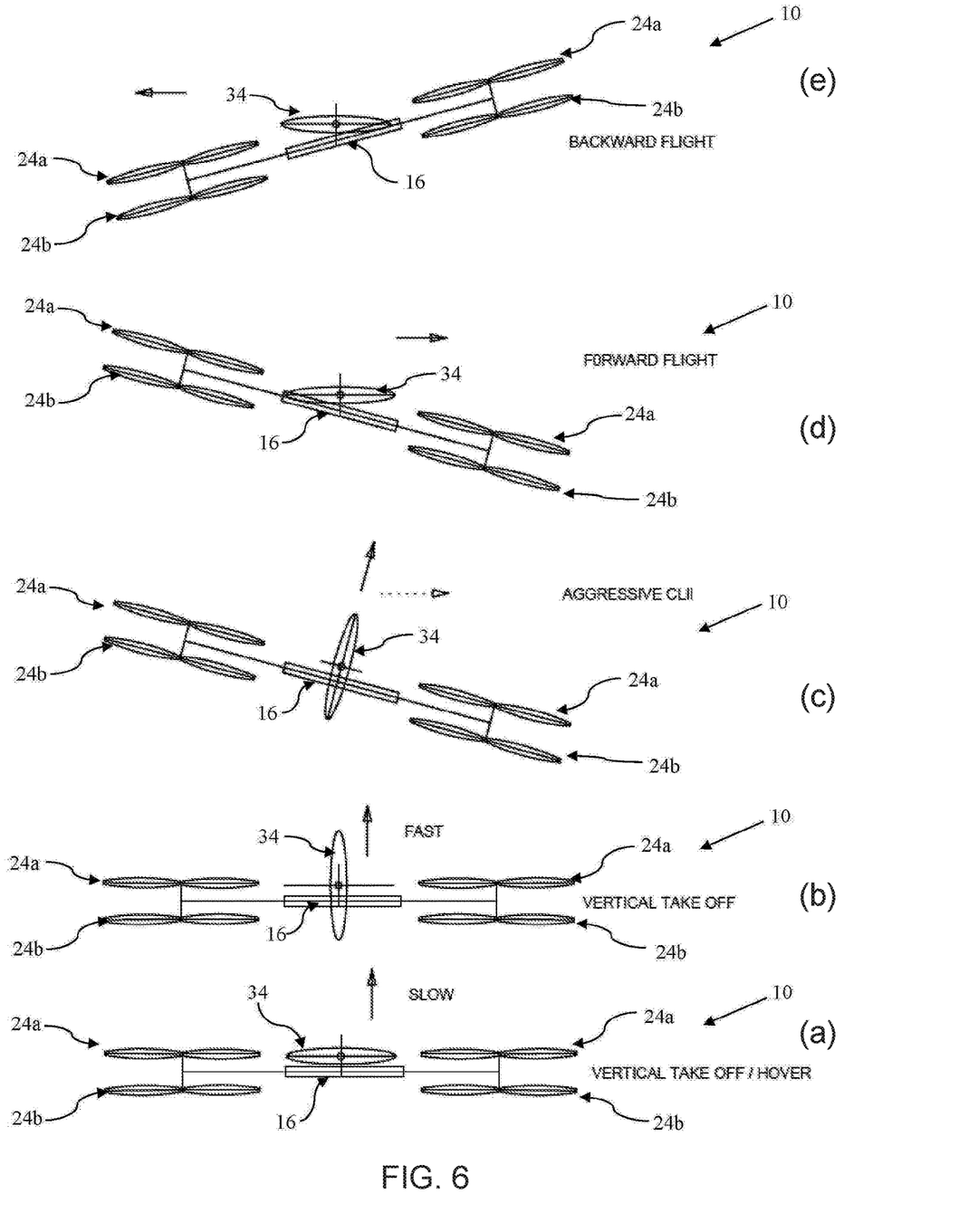
FIG. 6(a) shows a side representation of the hybrid unmanned aerial vehicle of FIG. 1 in a controlled vertical take-off or hover condition.
FIG. 6(b) shows a side representation of the hybrid unmanned aerial vehicle of FIG. 1 in a rapid vertical take-off condition.
FIG. 6(c) shows a side representation of the hybrid unmanned aerial vehicle of FIG. 1 in a rapid climb in a forward direction.
FIG. 6(d) shows a side representation of the hybrid unmanned aerial vehicle of FIG. 1 in a controlled forward flight condition.
FIG. 6(e) shows a side representation of the hybrid unmanned aerial vehicle of FIG. 1 in a controlled backward flight condition.

An exemplary operational flight pattern of the hybrid unmanned aerial vehicle 10 is illustrated in FIGS. 6(*a*) to 6(*e*).

A hover or slow ascent or descent condition is shown in FIG. 6(*a*). The pair of wings 34 have been positioned in a horizontal or substantially horizontal configuration, thereby creating drag as the hybrid unmanned aerial vehicle 10 attempts vertical take-off or landing (VTOL). This provides for more controlled ascent or descent for the hybrid unmanned aerial vehicle 10, and the change in vertical position is relatively slow. Lift is here provided by the plurality of multicopter propulsion units 22, as if acting as a multicopter. In a hover condition, the pair of wings 34 may also provide some stabilising lift to the hybrid unmanned aerial vehicle 10, or may serve to generate a small amount of drag.

If a fast ascent or descent is required, then the pair of wings 34 can be actuated into a second, vertical or near-vertical condition. This is shown in FIG. 6(*b*) in which the pair of wings 34 are perpendicular to the position achieved in FIG. 6(*a*). To change the position of the wings 34, here, the controller 44 has issued a command to the motor 36 to rotate the wing axle 32, thereby drastically altering the angle-of-attack.

The repositioning of the pair of wings 34 minimises the drag experienced by the hybrid unmanned aerial vehicle 10 during the ascent or descent, allowing a much greater vertical acceleration to be achieved. This can beneficially improve the speed of take-off and landing of the hybrid unmanned aerial vehicle 10.

An aggressive climbing manoeuvre is illustrated in FIG. 6(*c*), in which a change in both the horizontal and vertical positions of the hybrid unmanned aerial vehicle 10 is effected simultaneously. Directional thrust can be provided by independently driving the plurality of multicopter propulsion units 22 so as to produce an overall three-dimensional flight vector. In this scenario, the pair of wings 34 is maintained so as to be perpendicular to a plane of the direction of travel of the airframe body 16 and/or the plane of the rotor blades 24 of the multicopter propulsion units 22, again, to minimize drag on the hybrid unmanned aerial vehicle 10 during an ascent.

It may be possible to angle the pair of wings 34 to gain lift from the direction of travel during an aggressive climb, that is, where there are both vertical and horizontal components to the climb; however, this may require a change to a thrust vector of the hybrid unmanned aerial vehicle 10 in order to compensate for the lift and drag developed by the wings 34. As such, it may be useful to provide a communications link between the flight controller and the wing controller to optimise the lift generated by both the multicopter propulsion units 22 and the pair of wings 34 in order to achieve a desired flight path.

In each of the examples in FIGS. 6(*a*) to 6(*c*), the hybrid unmanned aerial vehicle 10 has been primarily acting as a multicopter. However, in the flight configurations of FIGS. 6(*d*) and 6(*e*), the fixed-wing capabilities are realised.

Once a vertical flight position, typically a minimum safe height for flight once the hybrid unmanned aerial vehicle 10 is clear of obstacles, has been achieved by the hybrid unmanned aerial vehicle 10, then continuous flight mode can be activated. FIG. 6(*d*) shows a forward flight arrangement; the angle-of-attack of the pair of wings 34 is altered to act more like a fixed-wing aircraft, thereby providing the necessary lift, and directional thrust is provided by the multicopter propulsion units 22.

The optimum angle-of-attack is preferably determined by the onboard wing controller, by could alternatively be determined by the flight controller or another controller, and is implemented through the controller 44 which is connected to the motor 36. The optimum angle-of-attack may be determined from a wide variety of sources, such as from data received from the wing and airframe referencing means, from wing parameter data which may be stored on an onboard memory element, or from airflow information data relating to airflow across the hybrid unmanned aerial vehicle, which may be determined from an airflow calculation circuit.

Wing parameter data may be, for example, referenced positional, weight or volumetric data relating to the wings, and may include such information as wing area, aspect ratio, taper ratio, a sweep of the wing, a wing twist angle, and/or a thickness of the wing. The factors affecting wing size include cruise drag, stall speed, take-off and landing distance, manoeuvrability requirements, fuel volume, and hanger size.

Wing parameter data may also be wing-specific, for example, in the instances where different wings 34 are interchangeably engagable with the airframe body 16. Removable wings 34 may be provided with identifiers, such as RFID communicators, or wired and/or mechanical identification means, such as a specific interference fit with the airframe body 16, which allows the controller 44 to correctly identify the wings 34 attached. This will also allow relevant information to be either transmitted to, or recalled from a memory storage element, for the controller 44, which will be indicative of the lift capabilities of the pair of wings 34.

It may also be possible to provide interchangeable airframe loadouts, based on mission parameters. For example, different undercarriages could be provided dependent on a dependent load to be carried by the unmanned aerial vehicle.

Whilst the airframe body 16 is shown in a titled condition in each of FIGS. 6(d) and 6(e), it is noted that, with a correct application of thrust from the multicopter propulsion units 22, the entire airframe body 16 could be reoriented so as to be vertical or substantially vertical. This would allow a forward or reverse thrust of near 100% efficiency to be achieved; the multicopter propulsion units 22 would provide no lift, but solely horizontal thrust, and lift would be achieved purely via the pair of wings 34.

By altering the wing 34 configuration such that the pair of wings 34 provide the majority, and preferably all, of the necessary lift required to maintain consistent flight of the unmanned aerial vehicle 10, then the operational range of the hybrid unmanned aerial vehicle 10 can be significant increased, since the load on the multicopter propulsion units 22, and therefore drain on the onboard batteries, is significantly reduced, for a given payload weight. It is noted that, whilst onboard batteries are the most common form of propulsion power provision for unmanned aerial vehicle, combustible energy sources could be used, for example, in a petrol engine or turboprop engine.

During flight, the angle-of-attack can be consistently adapted for optimum flight to minimise drag, in response to the relative airflow on the hybrid unmanned aerial vehicle 10. This can be achieved via the feedback process illustrated in FIG. 5.

The positioning of the wing axle 32 in line with the centre-of-gravity of the hybrid unmanned aerial vehicle 10 advantageously allows the pitch of the pair of wings 34 to be angled in both positive and negative directions. The symmetry of the wings 34 therefore allows the hybrid unmanned aerial vehicle 10 to achieve both forward and backwards flight, as illustrated in FIG. 6(e), which mitigates the loss of manoeuvrability which would otherwise be associated with a fixed-wing craft.

Whilst the preceding embodiment has been described as having a pair of wings which are centrally oriented on the airframe body, it will be appreciate that a plurality of different pairs of wings, spaced apart on the airframe body could be provided, if stable flight could be achieved. For example, two pairs of wings, which are spaced apart along the airframe body either side of the centre of gravity, could be provided, which are respectively rotatable via front and rear axles. The wing pairs could be operable synchronously, or could be independently operable if an optimum lift could be provided accordingly. The total lift for the hybrid unmanned aerial vehicle could be increased using such an arrangement.

Similarly, a tailplane could be provided to stabilise the hybrid unmanned aerial vehicle, if only forward-flight were required and/or the centre-of-gravity of the hybrid unmanned aerial vehicle were offset from a centre point of the vehicle.

Similarly, whilst conjoined wings, interlinked by a wing axle, are suggested as an option, it will be appreciated that increased manoeuvrability of the hybrid unmanned aerial vehicle could be achieved by permitting independent alteration of the wing positions. This might be achievable, for example, by providing the wing control means so as to have a pair of motors each having a geared output, each wing of the pair of wings having a complementary gear associated therewith which is drivable by a respective motor of the pair of motors.

The controller, flight controller and wing controller have hereto been suggested as being different components within the hybrid unmanned aerial vehicle. It will, however, be appreciated that the function of each of these separate controllers could readily be consolidated into a single processing unit, just as easily as if separate controllers were provided.

It will be appreciated that no weight categorisation or classification is referenced in the above-described embodiment of the invention. It is noted that the weight limit for any given hybrid unmanned aerial vehicle will be determined primarily by the structural limitations of the materials used in construction of the airframe, and/or in the construction methods thereof.

Furthermore, whilst the change in angle-of-attack of the wings has been achieved in the above-described embodiment by altering a wing angle, there are other mechanisms by which the same effect could be achieved. For example, changes in the drag and/or lift profile for the wings could be achieved by a change in the shape of the wings during flight, for example, by use of a combination of flaps, ailerons, and/or flaperons, or wing warping could be considered.

Current developments in unmanned aerial vehicle technology have also directed towards the possibility of such vehicles being usable for manned flight. For example, the airframe previously described could feasibly be modified for use as a recreational light aircraft, wherein the airframe is capable of supporting a cockpit for at least one pilot and/or passenger to be located. Additional safety features may be required, such as the provision of an onboard control unit or parachutes, but the underlying technical aspects of the invention could be extended to this case. As such, whilst the intended use of the invention is anticipated as being for unmanned aerial vehicles, manned flight could also be considered.

It is therefore possible to provide an unmanned aerial vehicle which can operate either as a multicopter or as a fixed-wing type aircraft, obtaining many of the desirable characteristics of either. This is achieved by manipulating the wings of the hybrid unmanned aerial vehicle either to provide optimum lift or minimise drag, depending upon the operational mode of the hybrid unmanned aerial vehicle.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A hybrid unmanned aerial vehicle comprising:
a multicopter frame having a plurality of operable multicopter propulsion units;
an airframe body connected to the multicopter frame;
a pair of wings positioned on opposite sides of the airframe body;
a wing control system for manipulating the pair of wings with respect to the airframe body to alter an angle-of-attack of the pair of wings;
an airframe referencing system configured to determine a displacement of the airframe body with respect to a horizontal plane;
wherein, in a first wing condition, the angle-of-attack of the pair of wings is altered with respect to a relative airflow so as to produce zero lift, and, in a second wing condition, the angle-of-attack of the pair of wings is altered with respect to the relative airflow so as to produce an a non-zero lift;
wherein the wing control system comprises a wing controller disposed in communication with the airframe referencing system, the wing controller receiving an airframe orientation from the airframe referencing system, and the wing controller determining an actuation required by the wing control system to alter the current angle-of-attack of the pair of wings to a desired angle-of-attack based on the airframe orientation; and
wherein the wing controller includes a memory storage device having wing parameter data stored upon said memory storage device, whereby the wing controller being is configured to use the wing parameter data to determine the said actuation, and wherein the wing parameter data comprises at least one of referenced positional data, weight data, or volumetric data.

2. The hybrid unmanned aerial vehicle as claimed in claim 1, wherein in the first wing condition, the angle-of-attack is or is substantially vertical with respect to the relative airflow, and in the second wing condition, the angle-of-attack is or is substantially horizontal with respect to the relative airflow.

3. The hybrid unmanned aerial vehicle as claimed in claim 1, wherein the pair of wings is interconnected by a wing axle which is coupled to the airframe body, and the wing axle is controllable by the wing control system.

4. The hybrid unmanned aerial vehicle as claimed in claim 3, wherein the wing control system comprises a motor having a geared output, the wing axle including a complementary gear which is drivable by the geared output of the motor.

5. The hybrid unmanned aerial vehicle as claimed in claim 3, wherein the wing axle is coincident with a vertical plane through the multicopter frame containing the centre-of-gravity of the hybrid unmanned aerial vehicle.

6. The hybrid unmanned aerial vehicle as claimed in claim 1, wherein an angle-of-attack of each wing of the pair of wings is independently altered by the wing control system.

7. The hybrid unmanned aerial vehicle as claimed in claim 1, wherein each wing of the pair of wings is symmetric in at least one plane.

8. The hybrid unmanned aerial vehicle as claimed in claim 1, wherein the airframe referencing system comprises an inertial measurement unit and/or a plurality of accelerometers and/or gyroscopes positioned on the airframe body or multicopter frame.

9. The hybrid unmanned aerial vehicle as claimed in claim 1, further comprising a wing referencing system for determining a displacement of the pair of wings with respect to the airframe body and/or the relative airflow and/or a horizontal plane, wherein the wing controller is in communication with the wing referencing system to receive a wing orientation from the wing referencing system.

10. The hybrid unmanned aerial vehicle as claimed in claim 9, wherein the wing referencing system comprises an inertial measurement unit and/or a plurality of accelerometers and/or gyroscopes positioned on the pair of wings.

11. The hybrid unmanned aerial vehicle as claimed in claim 1, wherein the pair of wings are removably engageable with the airframe body, the wing parameter data comprising data indicative of wing characteristics of a plurality of different pairs of wings.

12. The hybrid unmanned aerial vehicle as claimed in claim 1, wherein the wing controller includes an airflow calculation circuit for determining airflow information data across the hybrid unmanned aerial vehicle, and the wing controller is configured to use the airflow information data to determine the actuation.

13. The hybrid unmanned aerial vehicle as claimed in claim 1, wherein the wing control system is operable independently of the plurality of operable multicopter propulsion units.

14. The hybrid unmanned aerial vehicle as claimed in claim 1, wherein the wing control means is adapted to alter a shape of the pair of wings so as to alter the angle-of-attack.

15. The hybrid unmanned aerial vehicle as claimed in claim 14, wherein the pair of wings is adapted via the use of any one of: flaps, ailerons or flaperons to alter the shape of the pair of wings in-flight; or via wing-warping.

16. A method of performing aerial manoeuvres for unmanned aerial vehicles, the method comprising the steps of:
a] providing a hybrid unmanned aerial vehicle as claimed in claim 1;
b] altering the angle-of-attack of the pair of wings into the first wing condition to perform a first aerial manoeuvre; and
c] altering the angle-of-attack of the pair of wings into the second wing condition to perform a second aerial manoeuvre.

17. The method as claimed in claim 16, wherein the first aerial manoeuvre is a vertical or substantially vertical ascent or descent of the hybrid unmanned aerial vehicle and/or wherein the second aerial manoeuvre is a controlled horizontal or substantially horizontal flight, a stationary hover, or a controlled vertical or substantially vertical ascent or descent of the hybrid unmanned aerial vehicle.

18. The hybrid unmanned aerial vehicle as claimed in claim 4, wherein the geared output includes a worm gear.

19. The hybrid unmanned aerial vehicle as claimed in claim 4, wherein the motor is a stepper motor.

* * * * *